United States Patent
Nakagawa et al.

(10) Patent No.: US 7,474,212 B2
(45) Date of Patent: Jan. 6, 2009

(54) OBJECT TAGGED WITH RFID TAG AND DEVICE AND METHOD FOR PROCESSING IT

(75) Inventors: Seiji Nakagawa, Akishima (JP); Minoru Okamoto, Hachioji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 164 days.

(21) Appl. No.: 11/176,929

(22) Filed: Jul. 7, 2005

(65) Prior Publication Data

US 2005/0242953 A1    Nov. 3, 2005

(30) Foreign Application Priority Data

Oct. 24, 2003    (JP) .............. 2003-364859

(51) Int. Cl.
*G08B 13/14* (2006.01)
(52) U.S. Cl. .............. 340/572.1; 340/572.4; 340/572.7; 340/572.8; 382/100; 382/135; 382/137; 235/38; 235/492
(58) Field of Classification Search .............. 340/572.1, 340/572.4, 572.7, 572.8; 382/100, 135, 137; 235/380, 492, 280, 38
See application file for complete search history.

(56) References Cited

U.S. PATENT DOCUMENTS

| | | | | |
|---|---|---|---|---|
| 4,918,631 | A * | 4/1990 | Hara et al. | 361/683 |
| 5,941,769 | A | 8/1999 | Order | 463/12 |
| 5,942,738 | A * | 8/1999 | Cesaire et al. | 235/380 |
| 5,955,961 | A * | 9/1999 | Wallerstein | 340/5.4 |
| 5,959,531 | A | 9/1999 | Gallagher et al. | 340/572.1 |
| 6,253,190 | B1 | 6/2001 | Sutherland | 705/20 |
| 6,371,375 | B1 | 4/2002 | Ackley et al. | |
| 6,404,339 | B1 | 6/2002 | Eberhardt | 340/572.1 |
| 6,842,106 | B2 * | 1/2005 | Hughes et al. | 340/5.8 |
| 2001/0041948 | A1 | 11/2001 | Ross et al. | |
| 2005/0263591 | A1 * | 12/2005 | Smith | 235/385 |

FOREIGN PATENT DOCUMENTS

| | | |
|---|---|---|
| FR | 2776153 | 9/1999 |
| JP | 9-297808 | 11/1997 |
| JP | 9297808 | 11/1997 |
| JP | 10-111935 | 4/1998 |
| JP | 10111935 | 4/1998 |
| JP | 2000-194806 | 7/2000 |
| JP | 2000 194806 | 7/2000 |

(Continued)

OTHER PUBLICATIONS

International Preliminary Report on Patentability dated Aug. 3, 2006 in respect to corresponding PCT Application No. PCT/JP2004/015624 filed Oct. 21, 2004.

(Continued)

*Primary Examiner*—Tai T Nguyen
(74) *Attorney, Agent, or Firm*—Ohlandt, Greeley, Ruggiero & Perle, L.L.P.

(57) ABSTRACT

The device will make it easy to recognize an individual object located at a specific location using radio frequency ID tags. The device includes an object having an object main body, a tag provided with the object main body, and a display section provided with the object main body to display the information corresponding to the ID information stored on the tag.

5 Claims, 12 Drawing Sheets

FOREIGN PATENT DOCUMENTS

| | | |
|---|---|---|
| JP | 2000194806 | 7/2000 |
| JP | 2000-255716 | 9/2000 |
| JP | 2000255716 | 9/2000 |
| JP | 2001005931 | 1/2001 |
| JP | 2002123805 | 4/2002 |
| JP | 2002-304600 | 10/2002 |
| JP | 2002304600 | 10/2002 |
| JP | 2003-116127 | 4/2003 |
| TW | 434522 | 5/2001 |
| TW | 552563 | 9/2003 |
| TW | 582615 | 4/2004 |
| WO | WO98/35243 | 8/1998 |
| WO | WO03/050749 | 6/2003 |

OTHER PUBLICATIONS

Search Report and Written Opinion dated Dec. 12, 2005, issued from the Intellectual Property Office of Singapore in connection with Singapore Patent App. No. 200504935-8.

Japanese Office Action dated Nov. 15, 2005 in regards to Japanese Patent Application No. 2003-364859 (w/ English translation).

International Search Report dated Nov. 12, 2004.

* cited by examiner

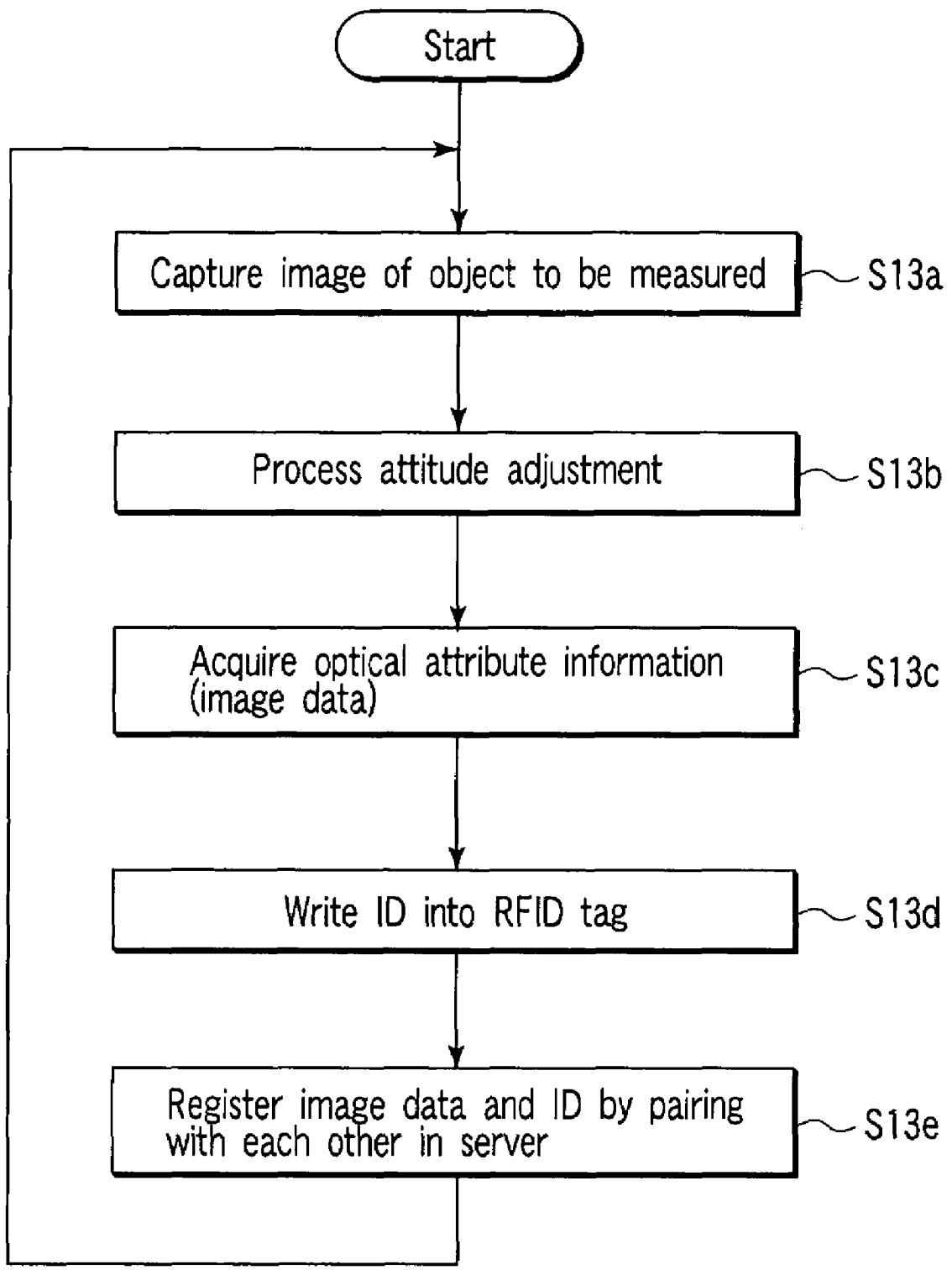
F I G. 13

US 7,474,212 B2

OBJECT TAGGED WITH RFID TAG AND DEVICE AND METHOD FOR PROCESSING IT

CROSS REFERENCE TO RELATED APPLICATIONS

This is a Continuation Application of PCT Application No. PCT/JP2004/015624, filed Oct. 21, 2004, which was published under PCT Article 21(2) in Japanese.

This application is based upon and claims the benefit of priority from prior Japanese Patent Application No. 2003-364859, filed Oct. 24, 2003, the entire contents of which are incorporated herein by reference.

BACKGROUND OF THE INVENTION

1. Field of the Invention

The invention relates generally to radio frequency identification (RFID) tags. More specifically, the invention pertains to a device and method for effectively processing and utilizing radio frequency identification tags.

2. Description of the Related Art

An RFID tag that has paired an integrated circuit (IC) chip and an antenna has already been developed. RFID tags can transmit data using radio waves as a medium to RF readers and has been recognized as an electronic tag. When a RF reader is in close proximity to a RFID tag, an electromotive force is generated in the RFID tag by the radio waves from the RF reader. A circuit is operated by the electromotive force and a circuit operates with the electromotive force. The RF reader can exchange, read, write, and delete data to and from the RFID tag.

A reference patent document 1: Jpn. Pat. Appln. KOKAI Publication No. 2003-116127.

BRIEF SUMMARY OF THE INVENTION

Problem to be solved: RFID tags are small in size (approximately 0.4 mm) and their chip areas are not more than 1 mm$^2$. Therefore, RFID tags can be attached to various types of objects. For instance, items in a store or components going through the different stages in a factory. RFID tags can be attached to even very small components going through the factory process.

Moreover, RFID tags can be mounted on a small-sized substrate or on a component with an IC mounted thereon, etc. Currently in an assembly line operation in a factory, substrates and components are carried by carrying devices as they go through the processing, inspection, sorting, and repair process. When an object with a RFID tag attached passes, the data of dates or inspection results are written into the memory (for example, with the capacity of tens of Kbytes or from tens to hundreds of Kbytes) of RFID tag. The extent of the range, for instance a diameter of 0.7 m, 1.5 m, or 5 m, is crucial in radio communication. There are numerous communication frequencies such as, 135 KHz, 13.56 MHz, 433 MHz, 860-930 MHz, and 2.45 GHz. The memory capacity, communication range, and communication frequency are changed and selected according to the condition and purpose of use.

Now, a RF reader will have trouble trying to access a specific object tagged with a RFID tag, because the reader is being sent numerous responses simultaneously from objects also tagged with RFID tags. This is because there are numerous RFID tags that are within the range in which the RF reader can pick up their signals.

The purpose of this invention is to provide a device and method that can easily recognize a particular object tagged with a RFID tag located in a specific position.

Means to solve the problem: A RFID tag, with data of the optical attribute of the object that it is attached to, will be placed on objects. The invention then can use the optical attribute data stored on the RFID tags when locating specific objects.

The invention for processing the object tagged with a RFID tag comprises of an object having an object main body, an RFID tag provided with the main body, a display unit provided with the main body to display the optical attribute information, a RF reading device for recognizing the attribute information by reading the display unit when the object tagged with a RFID tag is located at a specific position, and an access device for accessing the RFID tags tagged on the objects when the RF reading device recognizes the attribute information.

Using such an arrangement, the main body can be located by reading the attribute information of the object located at the specific position among many objects. If the main body is located, the processing device can securely access the RFID tag on the object.

BRIEF DESCRIPTION OF THE SEVERAL VIEWS OF THE DRAWING

FIG. 13 is a flowchart explaining a separate flow of the invention's device.

DETAILED DESCRIPTION OF THE INVENTION

Figure 1:
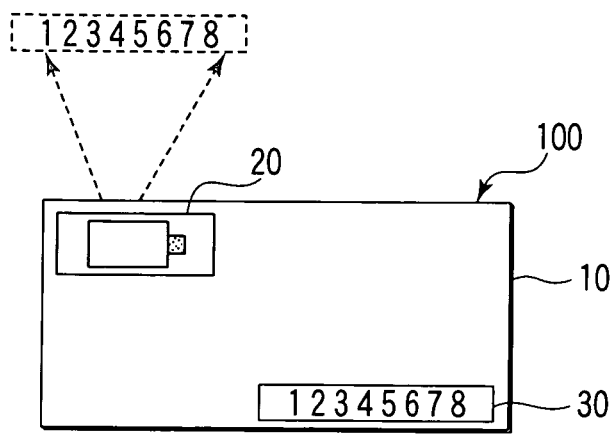
FIG. 1 is a view of the basic configuration of a an object with a RFID tag that the invention will utilize.

Henceforth, the different aspects of the invention will be explained by referring to the figures. FIG. 1 shows the basic configuration of an object with a RFID tag attached that the invention will use. An object 100 with a main body 10 has a RFID tag 20 attached. The object 100 also has a display section 30 attached on its main body 10.

Here, the information on the display section 30 can have a wide range of meaning. For example, the information on the display section 30 could be the same as the information that has been stored on the RFID tag 20 that is attached to the main body 10. Furthermore, the information on the display section 30 could be a numeric figure, a character, a graphic a pattern, a barcode, or a combination of the above. Using a watermark pattern, a watermark numeric figure, a watermark graphic figure, etc. on the display section would be useful. Moreover, the display section 30 could have been placed there by either being printed or stamped and could be displayed in color or with phosphors.

The information on the display section 30 could also be referring to the optical attribute information. The attribute information could have various meanings, such as, the shapes, the colors, the patterns, and the dimensions of the main body 10.

There are many ways to use the attribute information depending on the environment of the object 100. For example, there is a method of writing the attribute information on the RFID tag. There is also a method of using the attribute information by reading the attribute information written already on the RFID tag and then comparing it with other information.

The main body 10 could represent a variety of objects that need to be managed. For example, a product in a factory for a substrate (IC unit), a commercial product (clothes or shoes), packaged articles (fruits and vegetables), or currency (bills and coins).

An example method of how to use the display section 30 is explained below. If the identification information (ID) on the display section 30 is the same as the contents on the main body 10's RFID tag 20, then when the ID on the display section 30 is recognized, the object 10 can be identified. Therefore, if the object 10 is a bank note, the display section 30 will exhibit the number on the bill.

When a RF reader is in close proximity to the RFID tag 20, an electromotive force is generated in the RFID tag by the electric waves from the reader and the force operates as a circuit. The RFID tag has an antenna, a memory, a control circuit, and a driving circuit. The RFID tag may also have a power source or could be chargeable.

Figure 2:
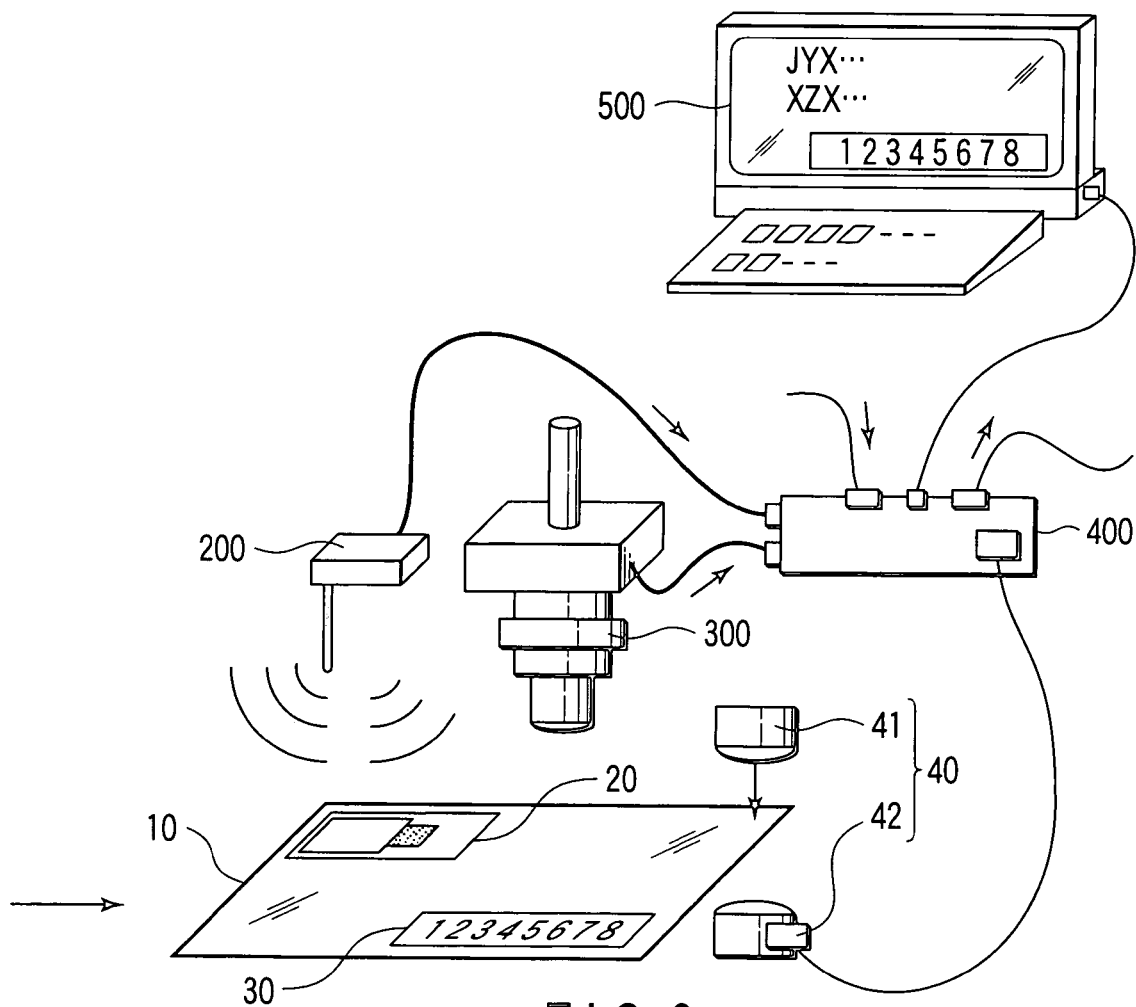
FIG. 2 is a view of the basic configuration of the access device and a RFID tag the invention utilizes.

FIG. 2 shows a case when the object 100 with a RFID tag attached is being checked at a specific position on the carrying path. When the object 100 with a RFID tag attached is carried to the specific position, it is detected by, for example, an optical detector 40. The detector 40 is comprised of a light emitting element 41 and a light receiving element 42 and detects the object 100 as it is being carried when the optical is halfway shut off. The detected signal is sent to a controller 400. The position of the object 100 when the detector 40 detects it is an optimum position for a video camera (imaging device) 300 to take an image.

When the detected signal is inputted, the controller 400 will drive the object 100 and its RFID tag with the video camera 300 (a scanner can be used, as long as it is an optical reading device) and capture its image. The video camera 300's direction is positioned so that it can capture the display section 30. The controller 400 analyzes the imaged signal output from the video camera 300. In other words, from the imaged signal, the controller 400 analyzes the displayed content of the display section 30 using digital processing. Using the result of the analysis, the ID (can be referred to as optical attribute information) being displayed in the display section 30 can be recognized. The controller 400 can display the ID of the display section 30 on a display 500.

As mentioned above, the optically recognized RFID tagged object 100's current specific positioning can be determined. Then, the controller 400 will determine whether or not the RFID tag of the object 100 needs to be accessed. If access is required, the controller 400 will control a radio communication unit 200 (also referred to as a reader/writer). The communication unit 200 has an antenna. Using the communication unit 200, information stored in the RFID tag 20 can be read or information can be written onto the RFID memory.

For example, the optical attribute information that has been read can be compared with the ID of the RFID that has been read. Or, the attribute information that corresponds to the optical attribute information that has been read can be written onto the RFID tag using the communication unit 200.

The video camera 300 can be used as a reading device. The controller 400 and the communication unit 200 can be used as access devices.

Figure 3:
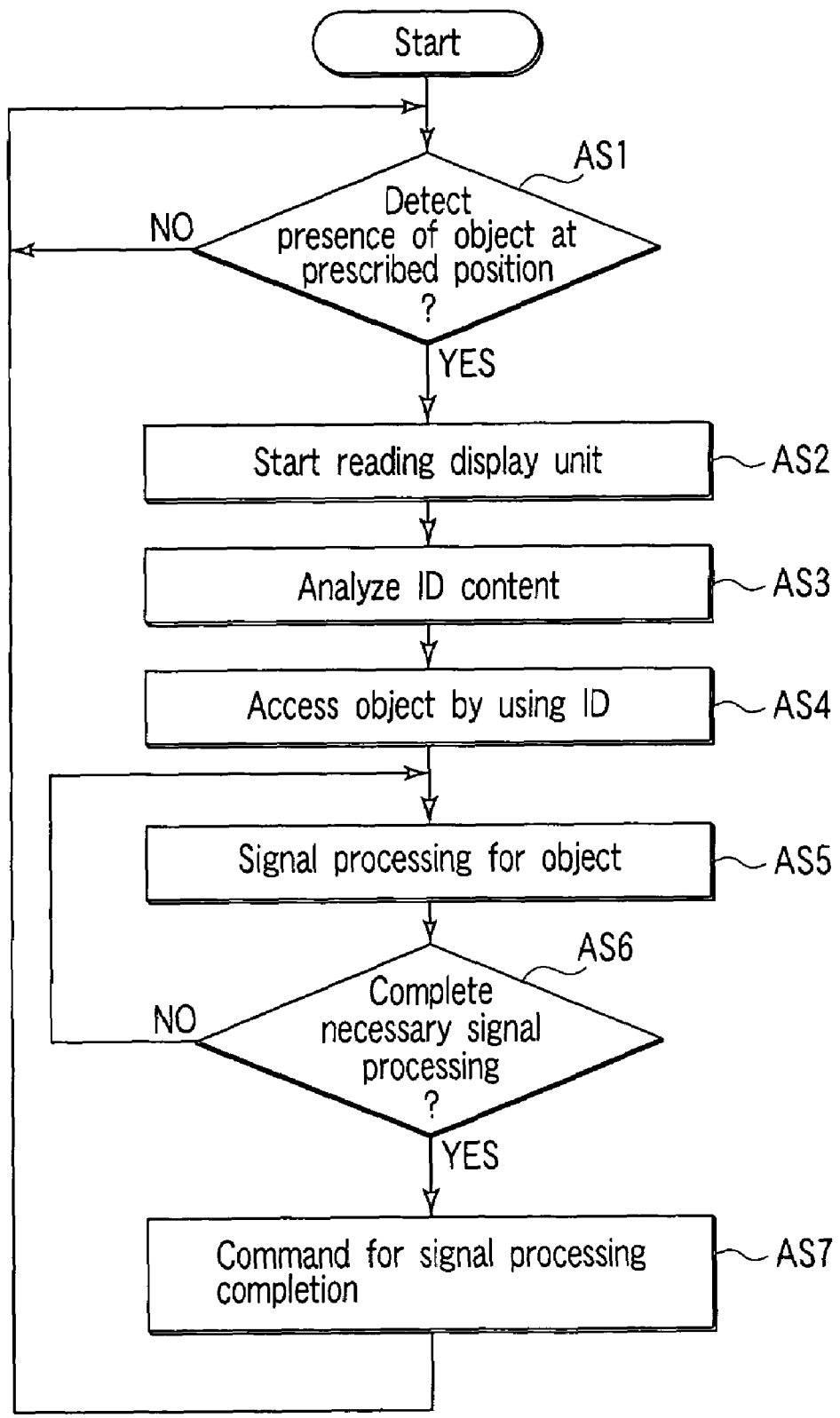
FIG. 3 is a flowchart of the paths the invention may take when processing the RFID tag of an object.

FIG. 3 shows an operation example of the controller 400. After detecting that an object is located at a specific position (step AS1), the controller 400 reads the display on the display section 30 (step AS2). Next, the controller 400 analyzes the ID content, which is the optical attribute information (step AS3). If it is necessary to access the object (more specifically, the RFID tag mounted on the object), the controller 400 will send communication information using the detected ID (steps AS4, AS5). The controller 400 determines whether or not the necessary signal processing for the current object has been completed, if it has already been completed, it sends a signal processing completion command to the object (step AS7).

Figure 4:
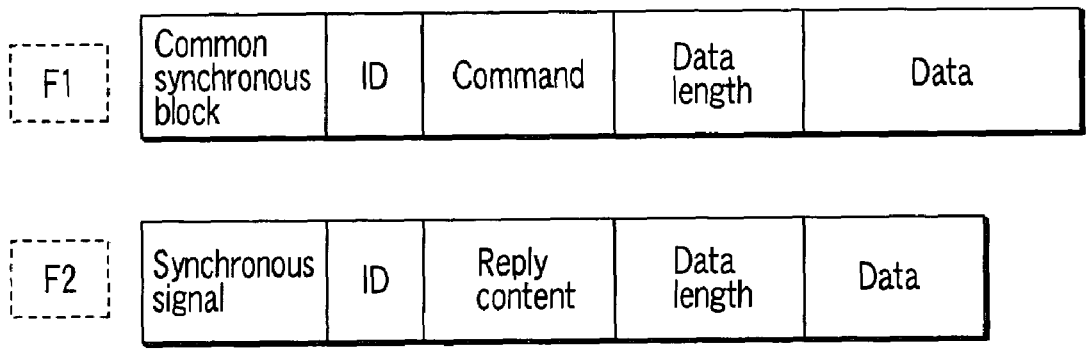
FIG. 4 is a view the format sample of the communication data adopted by the invention's device.

FIG. 4 shows examples of data formats in the frequencies F1 and F2 adopted by the communication unit 200 and the RFID tag 20, respectively. The communication unit 200 transmits a synchronous clock, an ID, a command, data length information, and data by a frequency F1. The RFID tag 20 can transmit a synchronous signal, its own ID, information indicating the presence or absence of a response content, information on its data length, and data. Other RFID tags adopt this format and differ only in IDs. The formats in FIG. 4 is exemplifying that in order for the RFID tag, the communication unit, and its communication content to correspond to the case of improved function, it is necessary to have formats that holds all kinds of information. Depending on the communication content, interleave processing, encryption processing, reverse-interleave processing, and decryption processing can be performed to the data to be transmitted.

Figure 5:
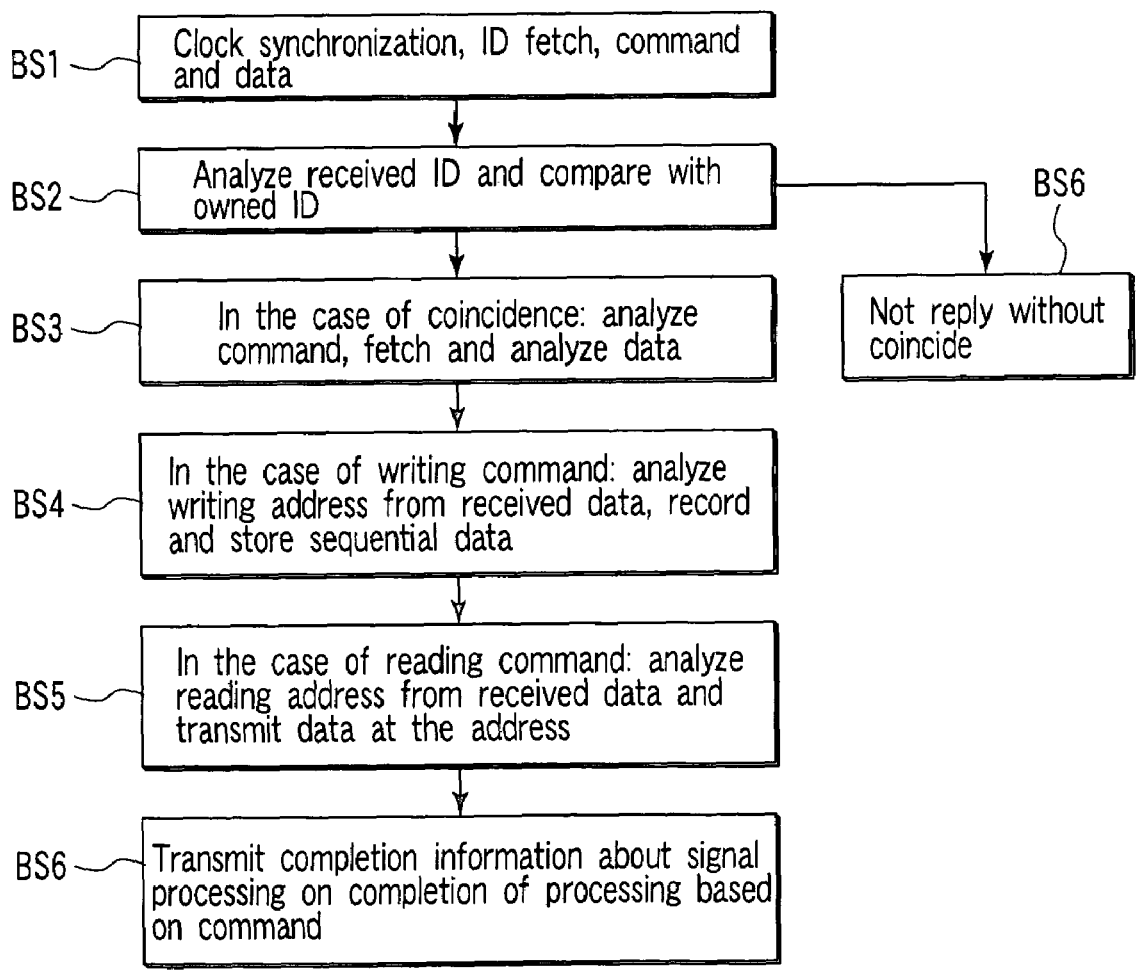
FIG. 5 is a flowchart of the operation commands the invention utilizes with RFID tags.

FIG. 5 shows the RFID tag 20's operation example. A signal with a frequency F1 is picked up by the antenna. Then, based on the synchronized clock sent, the internal clock is synchronized and the data ID, command, and data subsequently sent are captured in the register (step BS1). After that, the RFID tag 20 analyzes the ID which it receives (received ID) to its own ID (own ID) (step BS2). Based on the comparison result, if the received ID does not match its own ID, the RFID 20 will return to its initial state without replying (step BS6).

If the received ID matches its own ID, the RFID tag 20 analyzes the received command information and received data based on the analysis results. If for example, the received command information instructs data writing, the RFID tag 20 analyzes the content of the received data and writes the appropriate data and notes the address indicating the position in which the appropriate data is written. When the address is determined, the RFID tag 20 reads the data from the address and transmits the data in the formats shown in FIG. 4. When signal processing for the received command is completed, completion information is transmitted.

When the radio communication unit 200 receives the completion information, the processing shifts to step AS6 in FIG. 3 and the controller 400 confirms whether the necessary signal processing has been completed or not. When the necessary signal processing is completed, the controller 400 sends the command signal for signal processing completion. At this time, the carry device operates to shift the next object to the detection state.

The foregoing formats and flowcharts are shown as examples. The data processing contents and procedures are arbitrarily changed in response to the management contents of the RFID tagged objects. In relation to the communication format, it is not limited to the foregoing formats, a variety of types are available. It is also possible to transmit and receive data in plurality of kinds of formats by using a plurality of frequencies.

Figure 6:
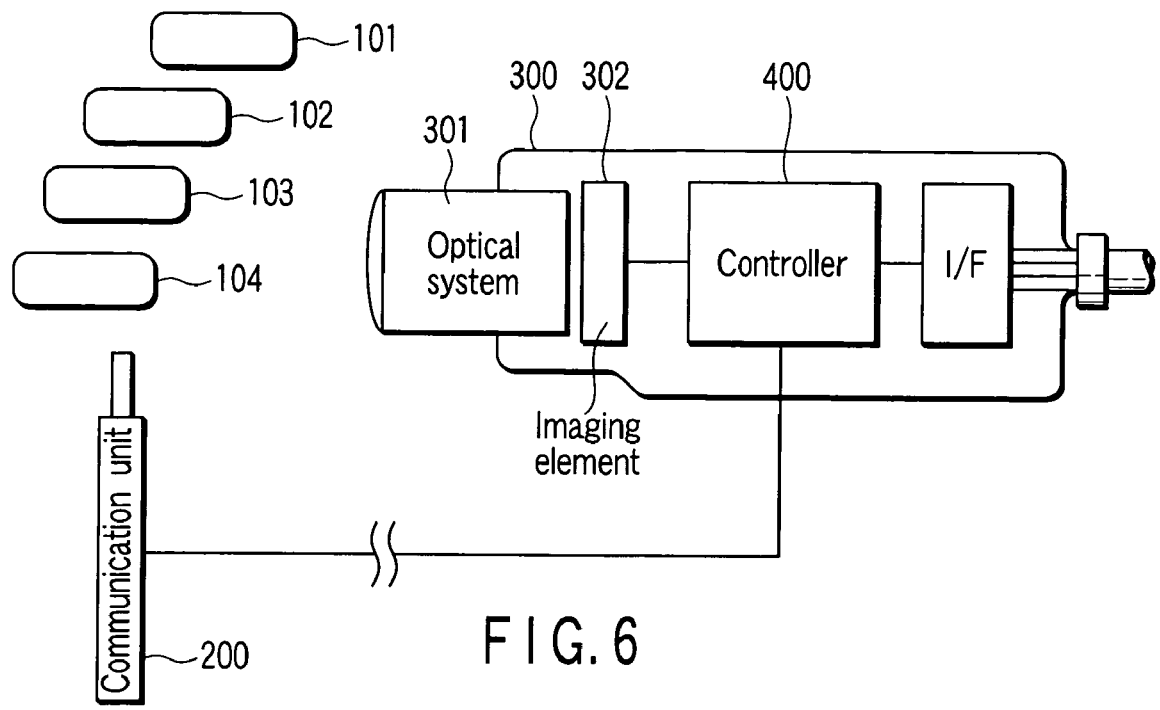
FIG. 6 is a separate view of the invention's device.

FIG. 6 shows another way of implementing the invention. This example is one in which the video camera 300 incorporates the controller 400. The video camera 200 has a telescopic lens as an optical system 301. Through the optical system 301, an light-condensed optical image is imaged-formed on a light-receiving surface of the imaging element 302 (imaging element using a CCD or CMOS transistor). The focused image is photoelectric-converted and captured into the controller 400 as an imaged signal.

The communication unit 200 is located remotely. It has been made so the RFID tagged objects 101-104 sequentially pass through near (electric wave area) the communication unit 200. For example, wild birds, trains, etc., tagged separately with RFID tags may pass through. The RFID tag is configured to be accessed if the desired object passes near the communication unit 200 and its RFID tag confirmed.

Figure 7:
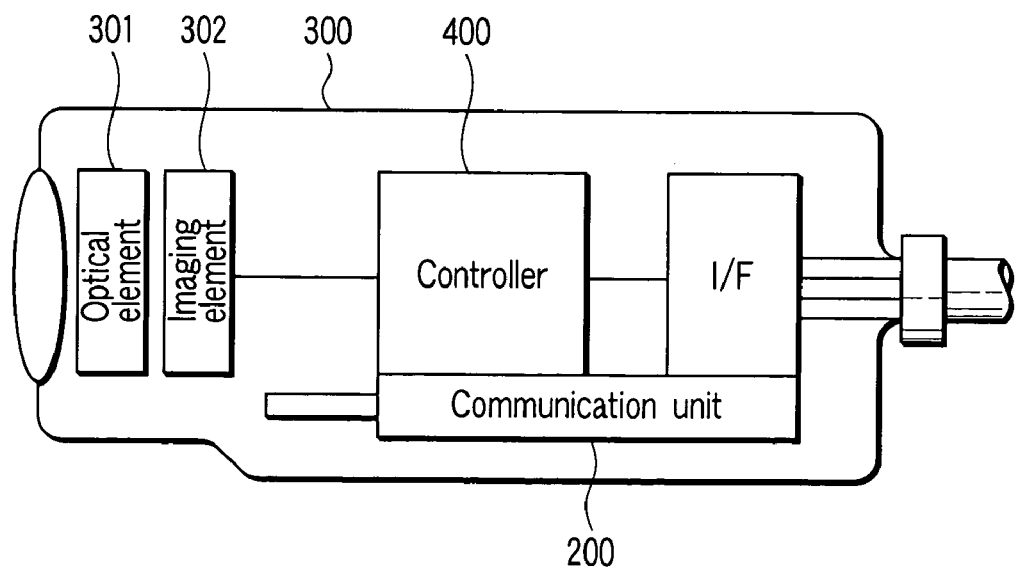
FIG. 7 is an additional view of the invention's device.

FIG. 7 shows yet another way of implementing the invention. This implication differs from FIG. 6 in that its optical system is a standard lens. This implication incorporates the communication unit 200 in the main body of the video camera 300.

Figure 8:
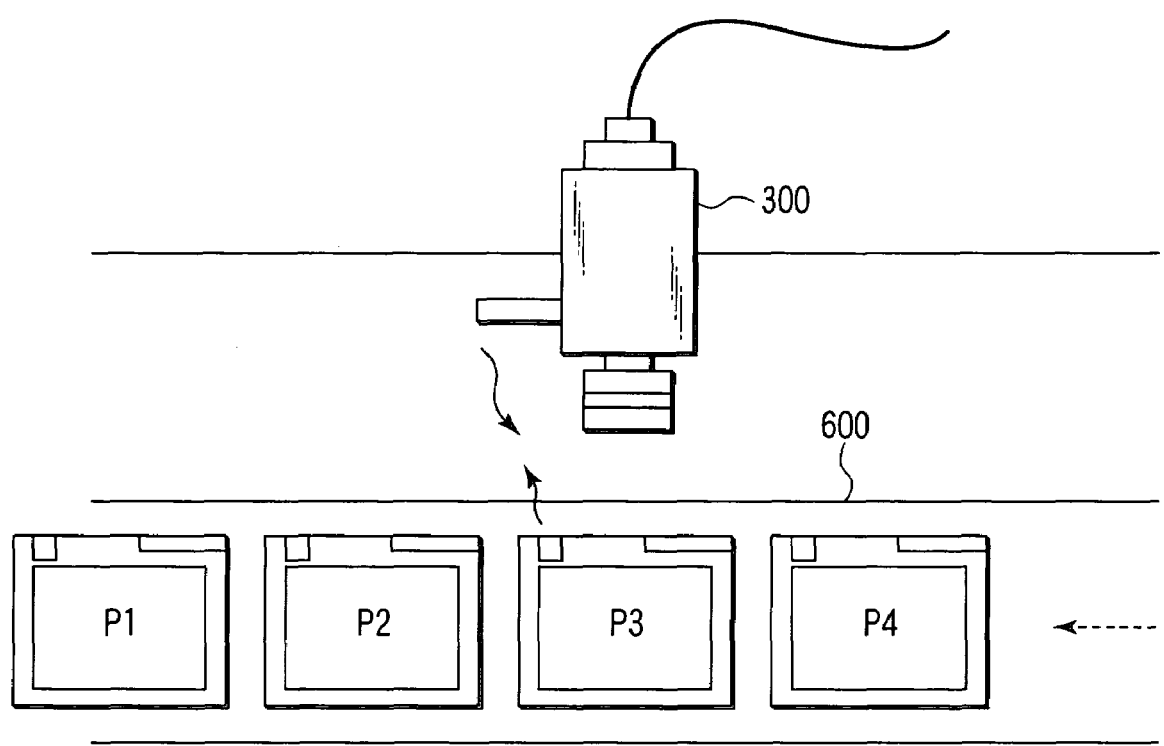
FIG. 8 is a view of an example usage of the invention's device.

FIG. 8 shows an example in which the video camera 300 shown in FIG. 7 writes or reads data into liquid crystal substrates or the RFID tag on a circuit board which are being carried down a path. As an example of data writing during the distribution process, there is an example of writing inspection or manufacturing data information and also another example of writing checking information, the location of pass-through, or data information. As an example of data reading, information stored on the recovered liquid crystal substrate or the RFID tag attached to the circuit board can be read, its history read, and traceability becomes possible. FIG. 8 shows an aspect that the video camera 300 communicates with the substrates P1, P2, sequentially confirms substrate P3 and communicates the substrate P3.

As described above, the imaging device 300 reads the information displayed on the display section 30 of the RFID tagged object 100. The controller 400 analyzes the optical attribute information (namely, ID) of the display section 30. After detecting the ID of the RFID tagged object 100, it becomes possible for the controller 400 to access the RFID tag 20 of the object 100.

The imaging device 300 and the controller 400 respectively have the function of analyzing the optical attribute information of the RFID tagged object 100. The attribute information includes the dimensions (size), the colors, the shapes, etc. of the RFID tagged objects 100. Thereby, the attribute information can be used to separate products. For example, this device can be utilized as a device that sorts products by color, shape, or dimension (size).

The imaging device 300 can write the attribute information onto the RFID tag 20 of object 100 with the corresponding RFID tag. If the attribute information has already been written onto the RFID tag 20, the controller 400 can recognize the attribute information through the communication unit 200, even if the object 100 has different colored RFID tags and is in a dark spot.

Figure 9A:
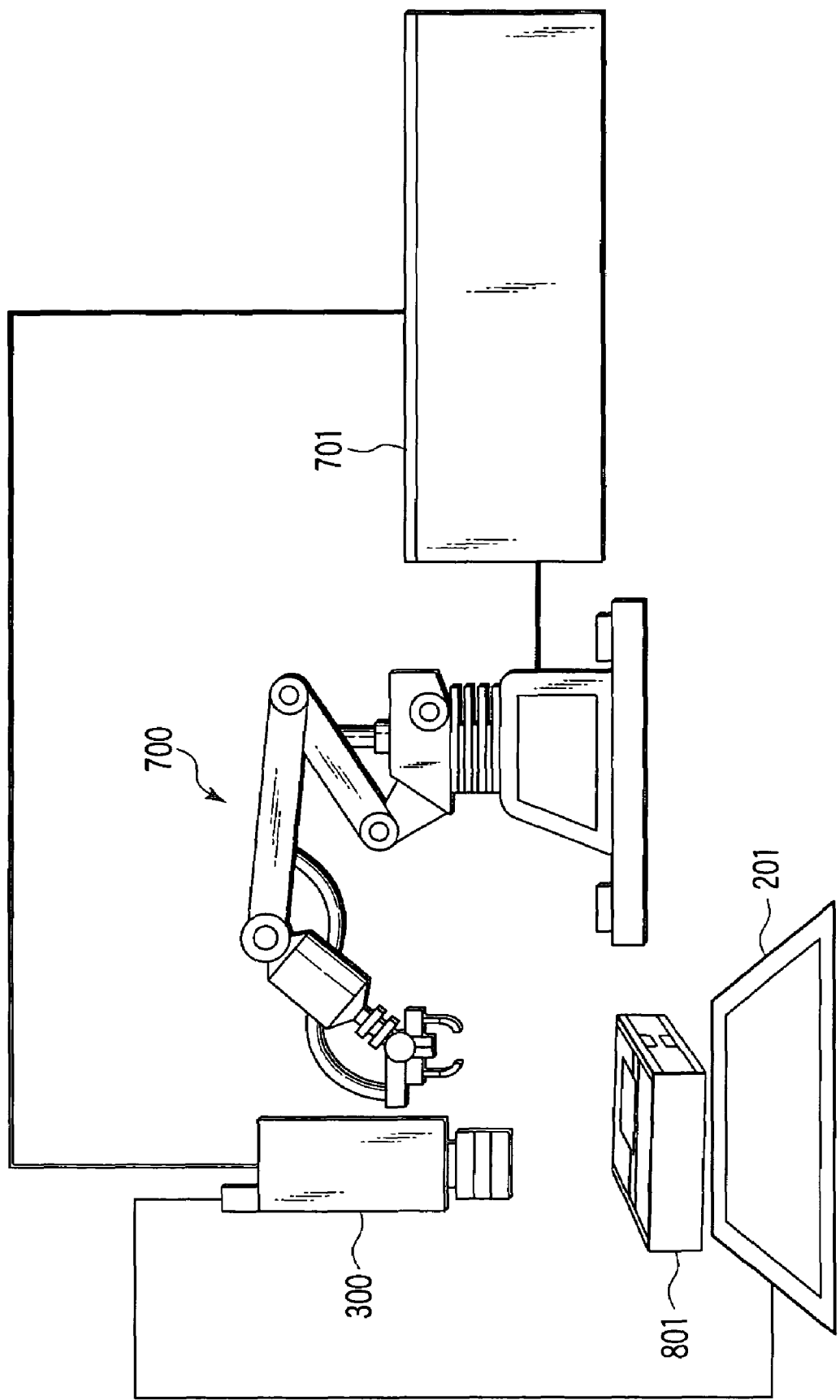
FIG. 9A is an explanatory view of an example usage of the invention's device.

The invention can be used in a variety of applications, hereinafter, another example will be explained. In FIG. 9A, a sorting robot 700's operation is controlled by a robot control unit 701. The robot 700 performs the positioning of a packing box 801 sequentially carried by a carrying device (not shown). By positioning, the tag information on the packing box 801 is arranged on to an antenna 201 of the communication unit 200. The controller 400 (refer to FIG. 6) in the imaging device 300 captures the tag information of the RFID tags of the respective box 801. The tag information includes, for example, the product or article information in the box 801.

Figure 9B:
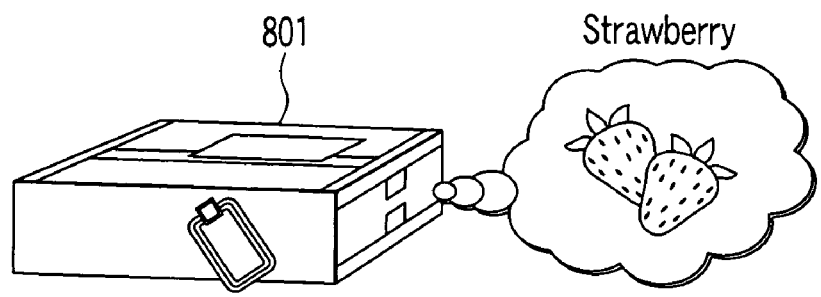
FIG. 9B is an explanatory view of a situation of a packing box recognized by the invention's device.

For now, it will be assumed that the articles in the box 801 are strawberries (refer to FIG. 9B). The controller 400 analyzes the tag information and transmits article termination information as analysis results to the robot control unit 701. The control unit 701 then moves the box 801 to a strawberry carrying unit because the contents of the box 801 was determined to be strawberries. At this point, the moving speed is set low and the holding force is set at weak to prevent the strawberries from being crushed.

Figure 9C:
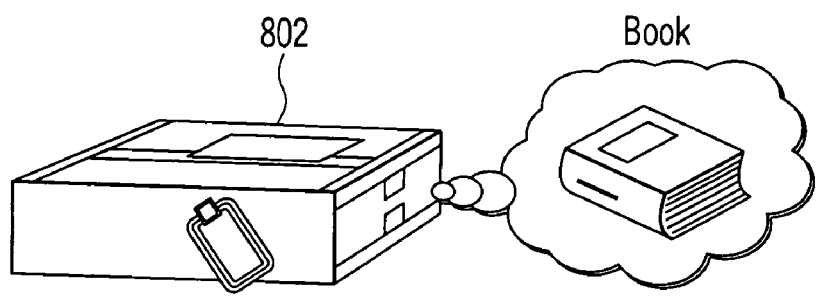
FIG. 9C is an explanatory view of a situation of a packing box recognized by the invention's device.

Next, it will be assumed that the article in a box 802, being carried by the carrying device, was determined to be a book by the result of tag information (refer to FIG. 9C). The controller 400 analyzes the tag information and transmits the article identification information as analysis results to the control unit 701. The control unit 701 then moves the box 802 to a book carrying unit because the contents of the box are not strawberries, but books. This time, the moving speed is set faster and the holding force set stronger than that of the case of strawberries.

As such, the examples of the device aspect of the invention respectively have reading/writing capabilities to read objects with RFID tags and the information stored on the tag and writing information onto the RFID tag. Each example also has optical system camera and a processing device for processing electron information acquired from the optical camera system. Furthermore, the example has a primary reading processing unit for reading optical camera system and a second reading processing unit for reading the tag information on the RFID tag through the reading/writing device. The example also has the means for generating an operation signal to operate the object in response to the read optical attribute information or the content of the tag information of the RFID tags.

Figure 9D:
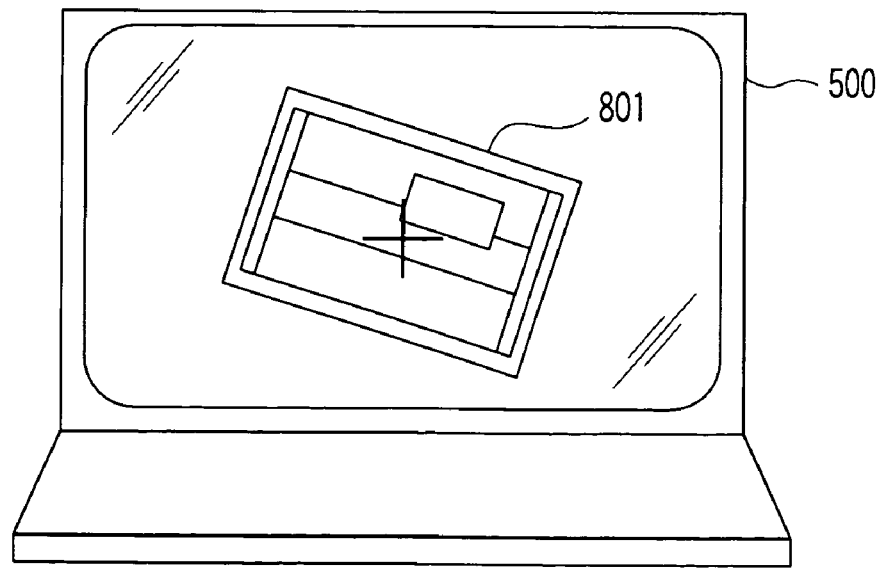
FIG. 9D is an explanatory view of the monitor that the invention's device utilizes.

FIG. 9D shows the aspect such that the position of the box 801 is rotated and displaced from its normal position when the imaging unit 300 captures the image of the box 801. A monitor 500 is disposed, for example, near the robot 700. The controller 400 performs the processing of image data displayed on the monitor 500. At this time, the controller 400 calculates the adjusting amount (the rotating direction, the linear moving direction, etc.) of the box 801 and generates control data to be sent to the control unit 701. The control 701 adjusts the attitude of the box 801 according to the control data.

Figure 10:
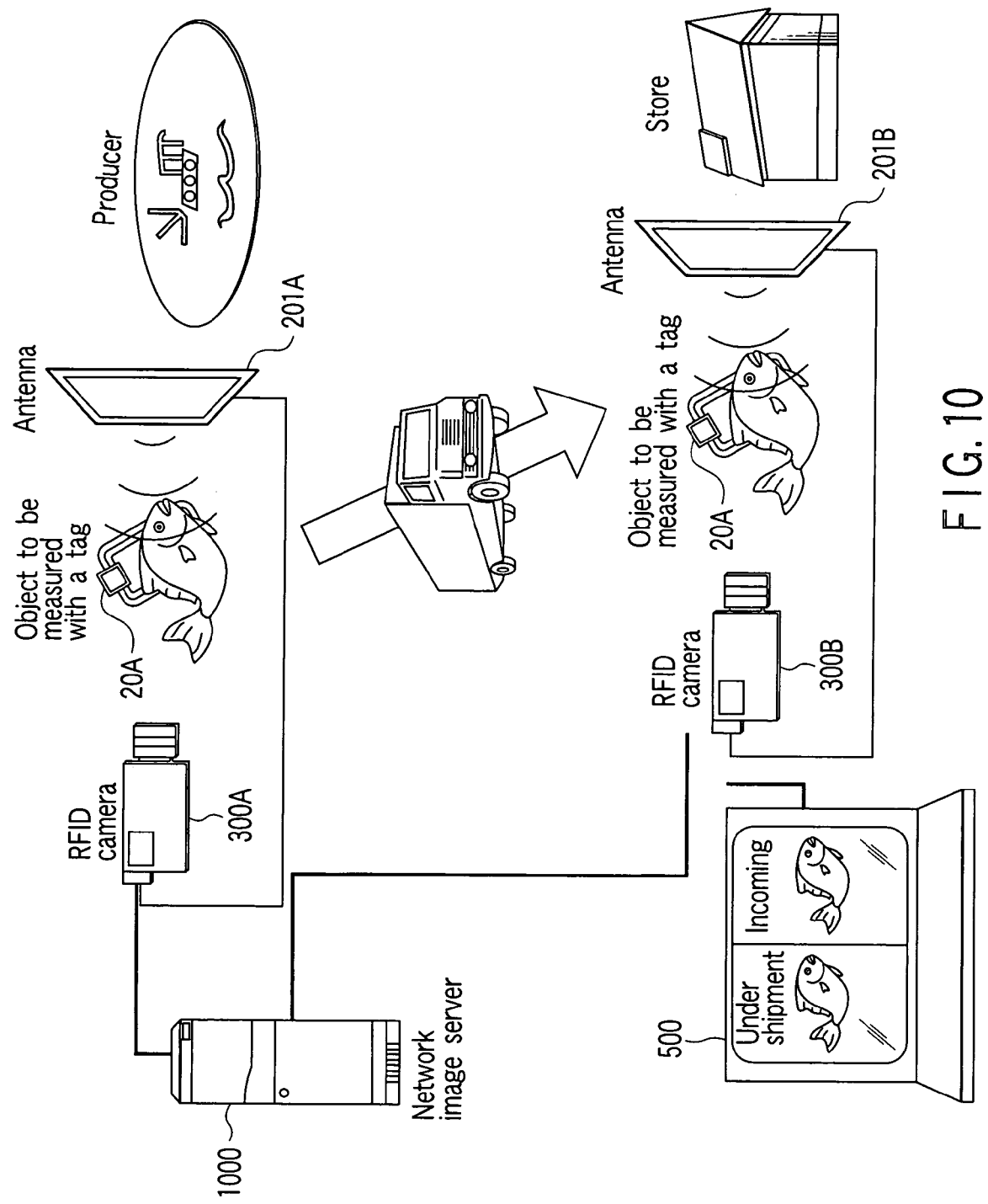
FIG. 10 is another explanatory view of the usage of the invention's device.

The device aspect of the invention can also be operated by using the internet server. As shown in FIG. 10, for example, the RFID tag 20A with a unique ID is attached to fish from a producer. The article registration information (optical attribute information) with the proper ID of the RFID tag 20A and the fish image therein become a pair and are transmitted to a server 1000 to be stored. The imaging unit 300A is used to capture images and the antenna 201A is used to write the appropriate ID onto the RFID tag 20A. For example, the producer ID, the produced date, and the serial number are written as the appropriate ID.

The fish (article) mentioned above is carried into a store (supermarket, department store, convenience store, etc.). Before being brought into the store, the article's origin is checked. When checking the place of origin, the proper ID of the RFID 20A that is attached to the article is read out. The imaging device 300B captures the image of the article and displays the image on the right side of the screen on the monitor 500. At the same time, the proper ID of the RFID 10A is read via the antenna 201B of the communication unit. The controller 400 (or a personal computer) accesses the server 1000 via the internet. The server 1000 registers the article registration image to the corresponding proper ID. The registration image is, thereby, read from the server 1000 and displayed on the left side of the monitor 500. A user can then confirm whether the articles that were sent from the producers is the same as the incoming articles by comparing the images on the left and right side of the screen. Consequently, the reliability of distribution in shipping and incoming products and articles can be improved.

Figure 11A:
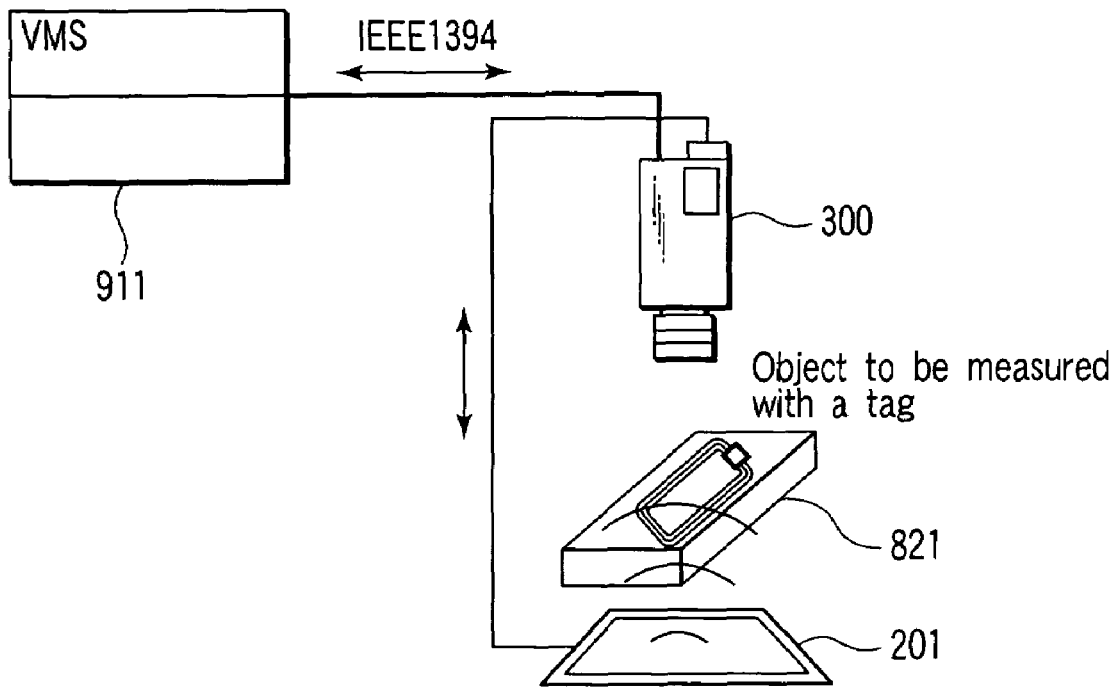
FIG. 11A is a separate explanatory view of the usage of the invention's device.
Figure 11B:
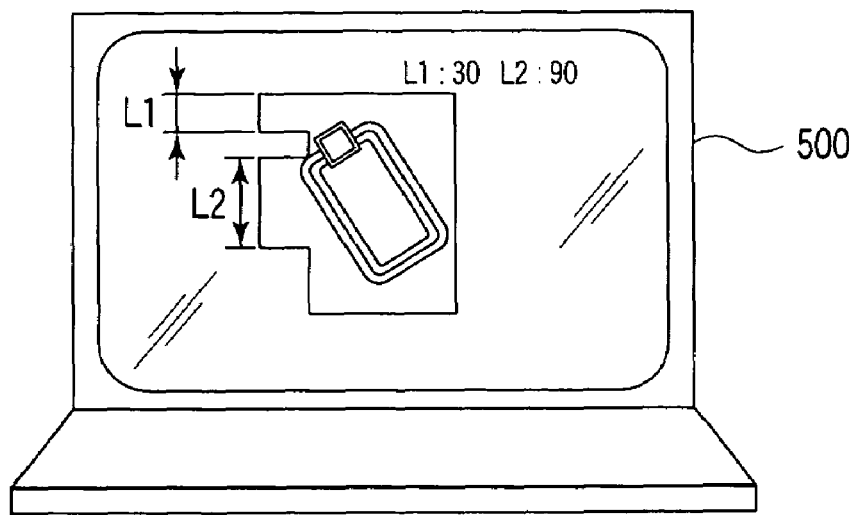
FIG. 11B is an explanatory view of the monitor when the invention's device is in usage.

FIG. 11A shows an example of the device aspect of the invention in which the device writes the optical attribute information onto a RFID tag. The numeric figure 821 designates the product with a RFID or the object to be measured. The imaging unit 300 captures the image of the object 821 to be measured and transfers its image data to a image processing device 911. For example, the processing device 911 measures the appearance or dimensions of the object 821. As shown in FIG. 11B, the processing device 911 measures, for example, the dimensions L1 and L2 of the object 821. These dimensions can be measured by using, for example, a conversion table between the imaging magnification of the imaging unit 300 and the address of the frame memory with the image data stored thereon, an imaging-object shape recognizing software, and an inter-address distance.

The foregoing optical attribute information is written onto the RFID tag. The optical attribute information is the appearance data of the object 821 to be measured is, thereby, written onto the RFID tag. Since the product 821 has specific optical attribute information, even a device that can only recognize RFID information (that is, a device that does not have an optical camera system) can recognize the dimensions of the product 821 form the RFID tag information. The device aspect of the invention, explained in more detail by referring to FIG. 10, it is possible to use both the optical attribute and the RFID tag information.

Figure 12:
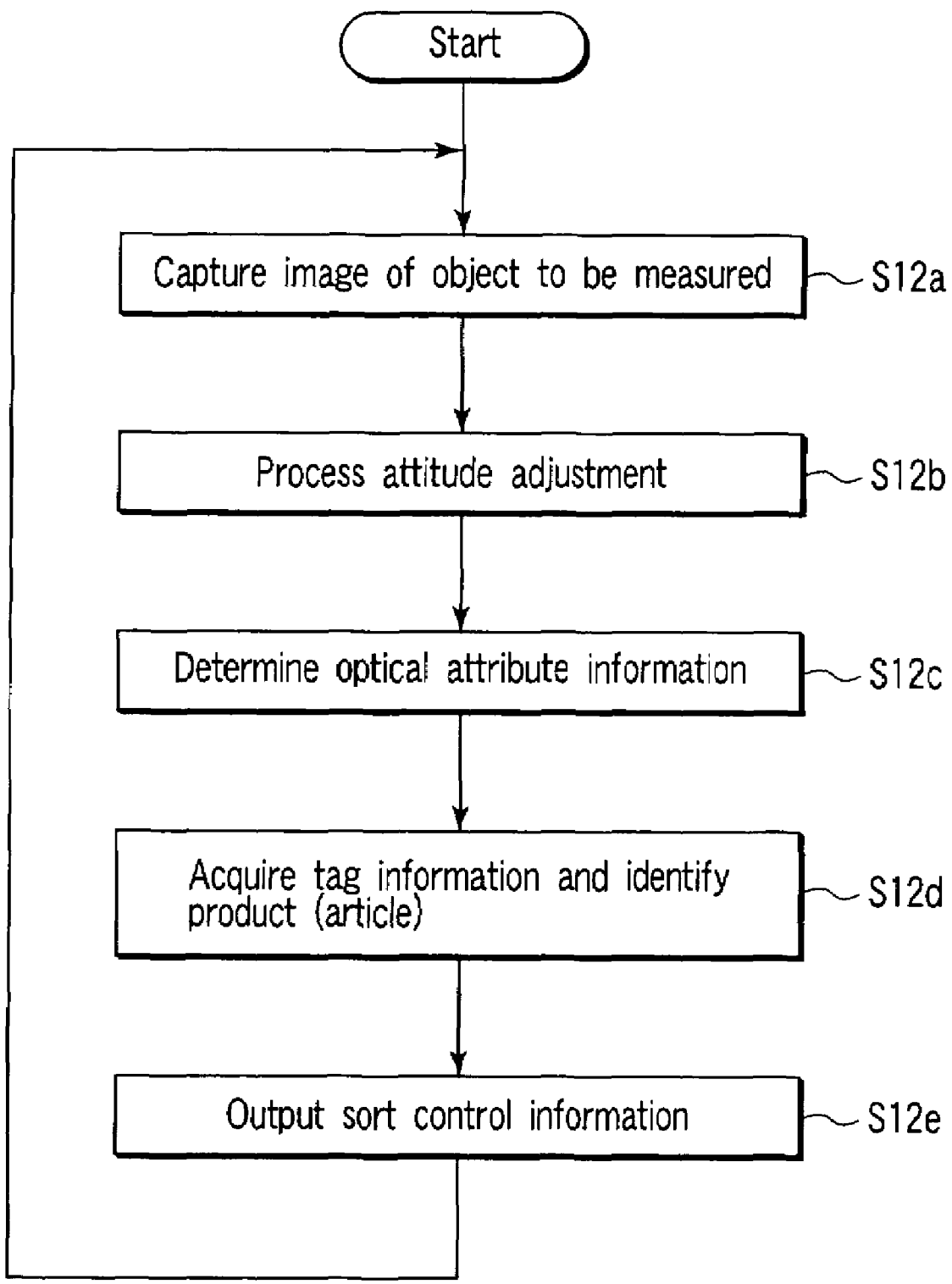
FIG. 12 is a flowchart explaining the flow the of the invention's device.

FIG. 12 shows the flow of operations of the device controlled by the controller 400 in the device aspect of the invention which have been explained in FIG. 9A-FIG. 9D respectively. The device captures the image of the object to be measured or the packing box to adjust the attitude of the box (steps S12a, S12b). Next, the device determines the optical attribute information. The attribute information includes information such as the dimensions, the size, the shape, and the color (step S12c). Then, the device acquires the tag information of the box (step S12d). By acquiring the tag information, the content of the box becomes clear. In the example in FIG. 9A, a box of strawberries and a box of books are identified. According to the identification result, the controller 400 generates sorting control information to be transmitted to the robot control unit 701 (step S12e). Although the attribute information was not used in the explanation of FIG. 9A-FIG. 9D, the strawberries, even old ones, may be set to be moved to the discard line, for example, by checking the manufacture and manufacturing data, etc., included in the attribute information.

FIG. 13 shows the flow of operation of the device controlled by the controller 400 incorporated in the imaging device 300A on the producer side which has been explained in FIG. 10. The device captures the images of the object to be measured or the packing box. FIG. 10 shows an example where a fish is the article. The device captures the image of the fish and adjusts the imaged-attitude thereof (steps S13a, S13b). Next, the optical attribute information, that is, the image that expresses the feature of the fish is captured (step S13c). Then, the device writes the ID, which is the tag information, onto the RFID tag attached to the fish (step S13d). This ID contains such information as the producer code, the fish code, and the date. Next, the ID and the image data of the fish are paired to be transferred to the server and registered (step S13e).

Figure 14:
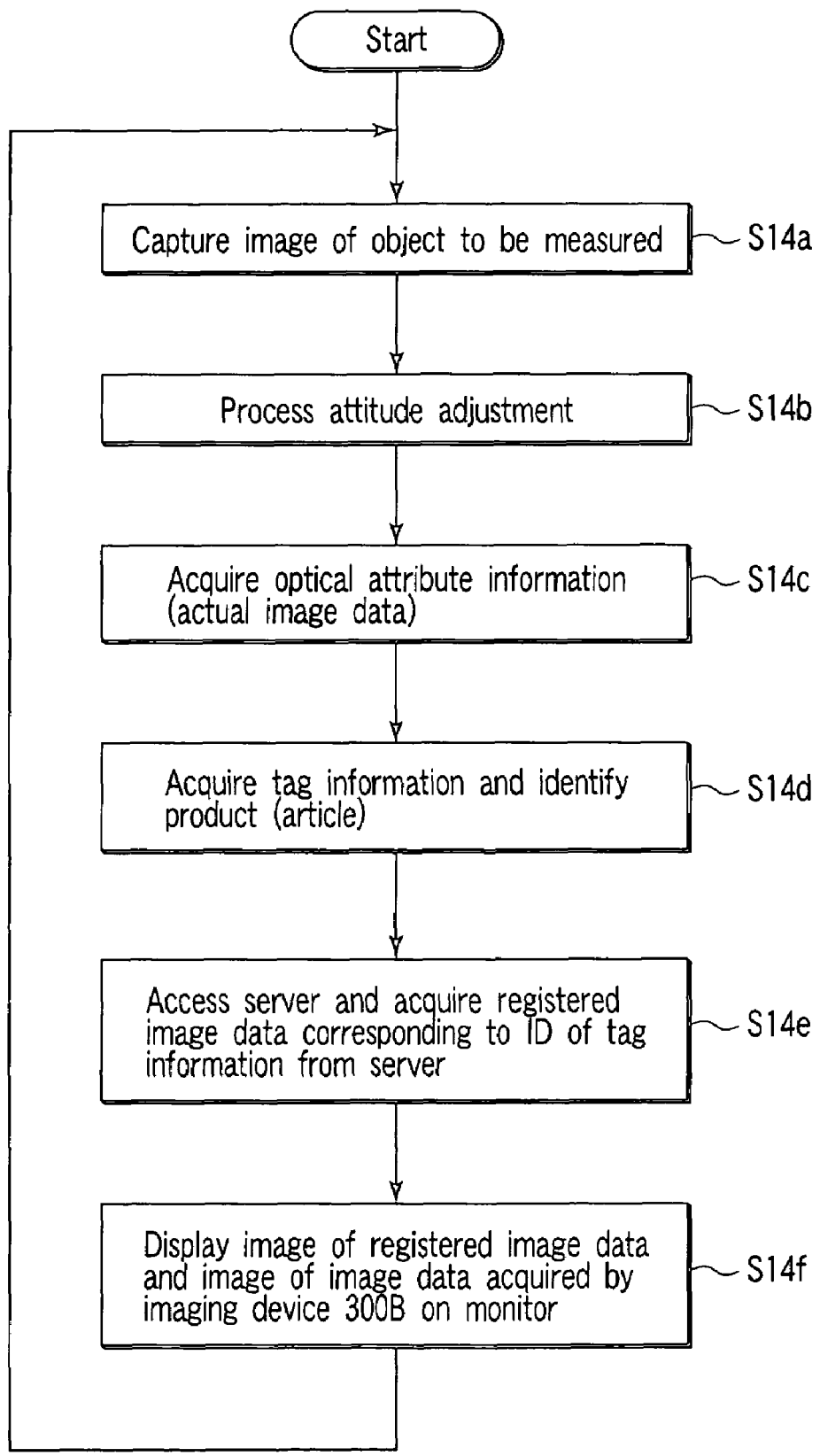
FIG. 14 is another flowchart explaining a separate example usage of the invention's device.

FIG. 14 shows operations of the device controlled by the controller 400 incorporated in the imaging device 300B on the store side explained in FIG. 10. The device captures the image of the fish to adjust the attitude of the fish (steps S14a, S14b). Next, the optical attribute information, that is, the image that expresses the feature of the fish is captured (step S14c). Then, the device reads the ID, which is the tag information, from the RFID tag attached to the fish (step S14d). Next, the registered image data corresponding to the ID is acquired from the server, on the basis of the ID read (step S14e). The device then displays an image of the registered image data and an image of the actually imaged data on the monitor 500 for comparison (step S14f).

The invention is not limited to the specific details and representative examples shown and described herein, and during the implementation phase, various types of modification may be made without departing from the spirit or scope of the general inventive concept of the invention. Various types of the invention can be formed by appropriately combing a plurality of constituents elements disclosed in the foregoing examples. For example, some of the elements may be omitted from the main of the constituent elements shown in the examples mentioned above. The constituent elements from the different examples may also be appropriately combined.

The invention can be applied to many fields in which radio frequency data (RFID) tags are used. The invention can be applied to activities in production control and component management in a factory. The invention can also be applied to activities to manage products such as agricultural products and marine products on a commodity distribution route.

What is claimed is:

1. A device for processing an object with an RFID tag attached, comprising:

a robot control unit for controlling a sorting robot;

an object having an object main body, an RFID tag provided with the main body and a display unit provided with the main body to display an optical attribute information of the object, the RFID tag being configured to output a response only when stored ID information and received ID information are coincident, and not to output the response when the stored ID information and the received ID information are not coincident;

a video camera for recognizing the optical attribute information by reading the display unit when the object is located at a prescribed position; and a controller and a radio communication unit connected to the video camera, the controller and radio communication unit for accessing a plurality of RFID tagged objects by using the optical attribute information corresponding to the received ID information when the video camera recognizes the optical attribute information, the controller and radio communication unit only communicating with one of the plurality of RFID tags which has responded, wherein the controller has a function of analyzing a size, a color, and a shape of the object, obtaining article identification information, and transmitting the article identification information to the robot control unit.

2. The device for processing the object with a RFID tag attached according to claim 1, wherein the controller and the radio communication unit are incorporated in the video camera.

3. The device for processing the object with a RFID tag attached according to claim 1, wherein the radio communication unit or a part thereof is located at a place distant from the video camera.

4. The device for processing the object with a RFID tag attached according to claim 1, wherein the display unit is a number originally provided with the object.

5. A method for processing an object with a RFID tag attached composed of an object main body, a robot control unit for controlling a sorting robot, an RFID tag provided with the main body and a display unit provided with the main body to display optical attribute information of the object, the RFID tag being configured to output a response only when stored ID information and received ID information are coincident and not to output the response when the stored ID information and the received ID information are not coincident, a video camera for recognizing the optical attribute information by reading the display unit when the object is located at a prescribed position, and a controller and a radio communication unit connected to the video camera, for accessing a plurality of RFID tags by using the optical attribute information corresponding to the received ID information when the video camera recognizes the optical attribute information, the controller and the radio communication unit only communicating with one of the plurality of RFID tags which has responded, wherein the controller has a function of analyzing a size, a color, and a shape of the object to obtain article identification information, the method comprising:

reading the display unit and recognizing the optical attribute information;

accessing the plurality of RFID tags;

communicating with said one of the plurality of RFID tags which has responded obtaining the article identification information; and transmitting the article identification information to the robot control unit.

* * * * *